Dec. 1, 1970 A. W. SPENCER 3,544,676
FLATNESS CONTROL OF THERMOPLASTIC SHEETS
Filed Feb. 3, 1969 2 Sheets-Sheet 1

ARTHUR W. SPENCER
INVENTOR.

United States Patent Office 3,544,676
Patented Dec. 1, 1970

3,544,676
FLATNESS CONTROL OF THERMOPLASTIC SHEETS
Arthur W. Spencer, Rochester, N.Y., assignor to Eastman Kodak Company, Rochester, N.Y., a corporation of New Jersey
Filed Feb. 3, 1969, Ser. No. 796,057
Int. Cl. B29c 25/00
U.S. Cl. 264—346
7 Claims

ABSTRACT OF THE DISCLOSURE

In processes for manufacturing heat set, oriented thermoplastic films, irregularities in the form of limp or baggy areas are sometimes formed in the films. It has been discovered that such irregularities can be minimized by decreasing the rate of cooling of the effected areas of the film during the final cooling stage of the heat-relaxing step of such manufacturing processes.

---

Figure 1:
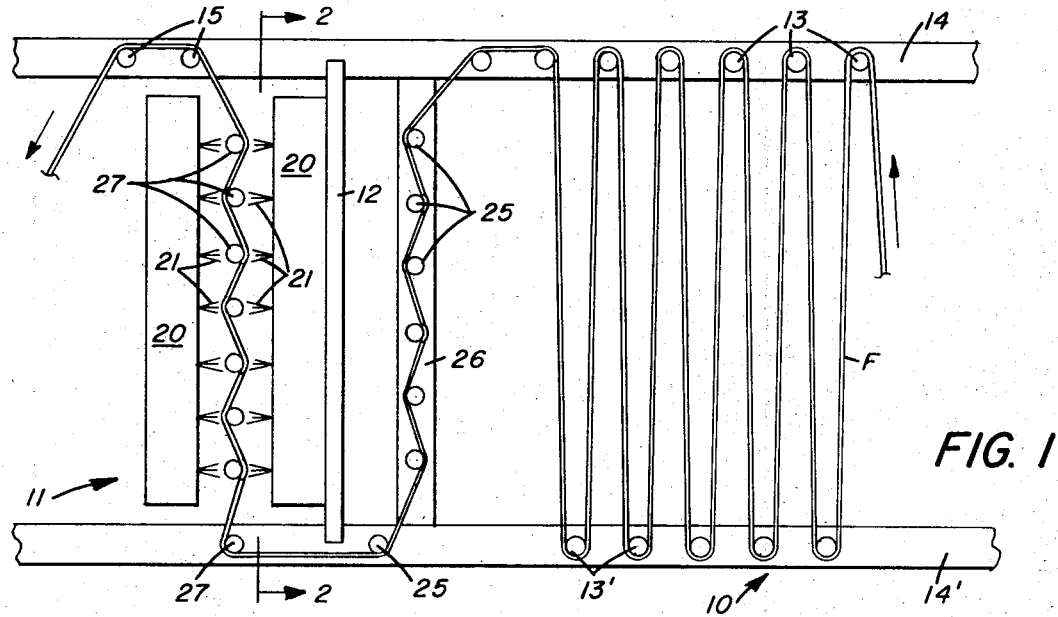

The present inventoin relates to the processing of thermoplastic films, and more particularly to the elimination or control of defects therein known as "baggy" or "limp" areas.

In the continuous preparation of thermoplastic films such as polyester films, cellulose ester films, polycarbonate films, polyvinyl films, polyolefin films, and the like, hot film, while it is gradually being cooled, is generally passed over a series of at least two idler rolls which are frequently spaced apart so that the film has unsupported spans of from about 6 feet to about 8 feet or more in length. In the cooling section of the particular piece of equipment being utilized, generally one or more of these long, unsupported spans of hot film (initially at a temperature within the range in which the film is "limp," but below the melting point of the polymer) is passed between air plenum chambers from which blasts of relatively cool air are directed at one side, or simultaneously at both sides of the film. Alternatively, the hot film can be passed over the surfaces of a series of cool rolls to thereby gradually reduce the temperature of the film.

Films that can be directionally oriented and heat set [such as polyester, of which poly(ethylene terephthalate) and poly(cyclohexane 1,4-dimethylene terephthalate) are examples], are also conventionally subjected to a special heat treatment (subsequent to the "heat set" treatment), known in the art as a "heat relax" treatment or step. This subsequent, special "heat relax" treatment is differentiated from a "heat set" treatment by the fact that, while some tension is applied to the film during the "heat set" operation (such that the dimensions of the film are held substantially constant during the "heat set" treatment), the film is maintained under only a slight tension during the subsequent "heat relax" step (see, for example, details in U.S. Pat. 2,779,684). The use of a "heat relax" step in such overall continuous processes results in a still further improvement in the dimensional stability of the finished film.

This subsequent heat treatment (i.e., subsequent to the "heat set" operation) is also, conventionally followed immediately by a cooling treatment, whereby the film is moved through a cooling section in order to fairly quickly lower its temperature to below the second order transition temperature of the film, so that the film is then in a condition suitable for further handling, including the winding of it onto rolls. Thus, in the continuous preparation of dimensionally stable, oriented, heat relaxed thermoplastic film there is (1) a "heat relaxing" step (involving heating the film under only slight tension at a temperature slightly above the softening temperature of the film to improve its dimensional stability) and (2) a subsequent cooling step (whereby the temperature of the film is lowered to below its softening temperature fairly quickly).

These two steps are carried out in enclosed, usually adjacent, sections of conventional film machines. The sections will herein be termed, respectively, the "heat relax section" (or "heat relax air section") and the "cooling section" (or "cooling air section") in the order in which the film is passed through these sections during its manufacture.

While oriented, heat relaxed thermoplastic films such as polyester films can contain several forms of defects, such as buckle, ripple, longitudinal corrugation and limpness defects, the present invention is directed to curing, or at least minimizing, limpness (often called "bagginess") defects which effect the overall flatness of the manufactured film. The reasons for the development of such areas of limpness or bagginess in the film sheets are not known with any degree of certainty because they develop in an unpredictable fashion, often when it appears that all of the important processing parameters are being maintained practically constant. Possibly such defects are caused by different orientation, thickness, rates of heating or cooling, or even by the particular geometry of the cooling section.

A primary object of this invention is to eliminate, or control, the level of "limpness" defect that sometimes develops in a thermoplastic, oriented, heat relaxed film.

Figure 2:
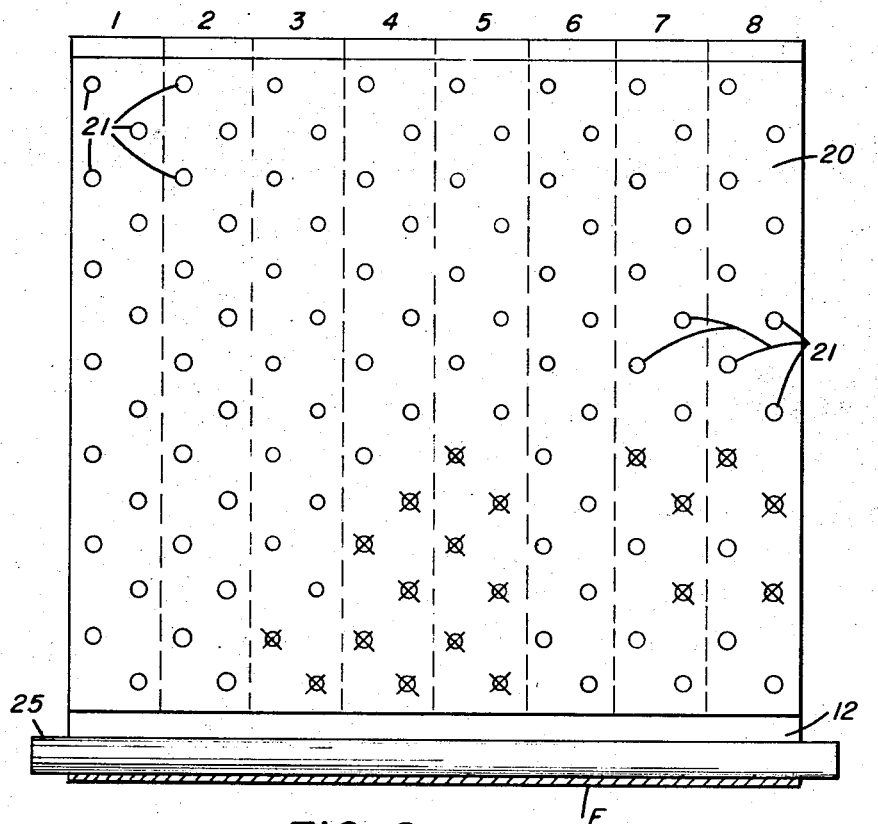
Figure 3:
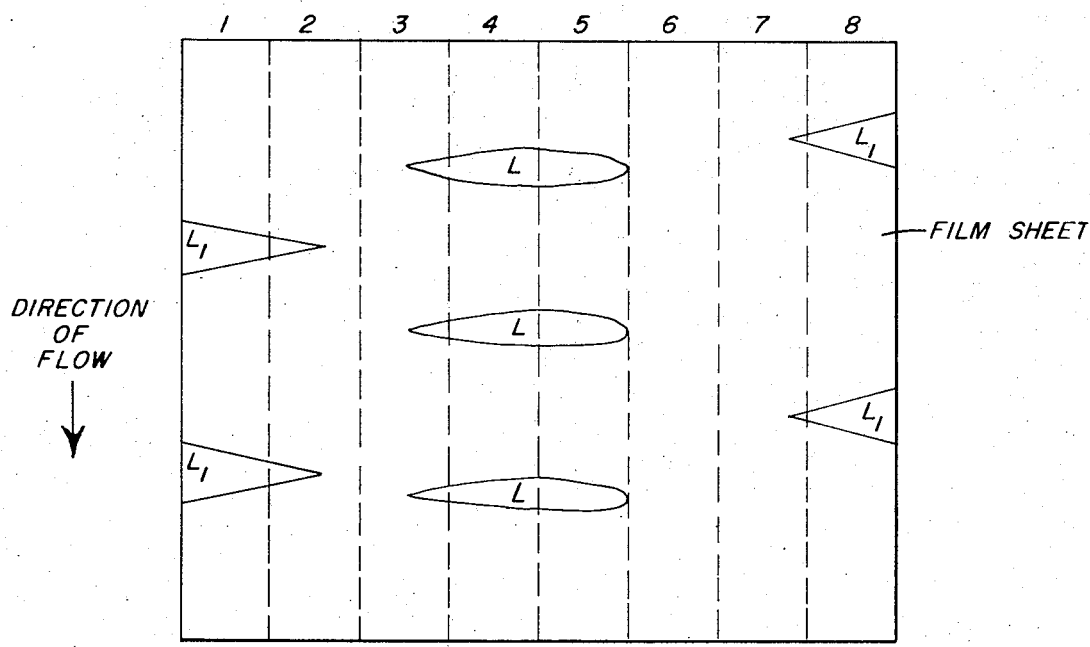

The novel features that I consider characteristic of my invention are set forth with particularity in the appended claims. The invention itself, however, both as to its organization and to its method of operation, together with additional objects and advantages thereof will best be understood from the following description when read in connection with the accompanying drawings in which:

FIG. 1 is a schematic view showing a typical film path used in the final heat relax and cooling sections of a polyester film making machine. Portions of this particular film path are described in considerable detail in U.S. patent application Ser. No. 678,735, filed Oct. 27, 1967;

FIG. 2 is a cutaway view at 22 of one part of the cooling section shown in FIG. 1; and FIG. 3 illustrates the typical appearance of film suffering from two types of "limpness" defect. These defects become very evident when a fairly long portion (about 12 feet long) of cooled film is laid out on a flat surface, and a slight electrostatic charge is induced into the film in order to make it lay flat against the surface. Then baggy areas L such as those appearing across sections 3, 4 and 5 along the film can readily be seen. Similarly, "limp" areas $L_1$ along one or more edges of the film readily appear in this test. It should be noted at this point that, whereas "baggy" areas having shaped generally similar to those designated L in FIG. 3 often appear in commercially manufactured films, they can appear at any position across the width of the film, and can be relatively larger or smaller than those illustrated. Similarly, loose or "long" edge areas $L_1$ can appear on one or both edges, can be varied in size, and do not necessarily appear simultaneously with "baggy" areas.

In FIG. 1, a thermoplastic, oriented sheet of film, F is transported through the final heat treatment hot air section 10 and then into the succeeding cooling air section 11, the two sections being separated by a partition 12. It should be understood that the film F before entering these last two treating sections 10 and 11 may have been oriented longitudinally, laterally, or both, before or after having been coated with a suitable substrata and heat treated one or more times to improve the dimensional stability of the film, dry the applied substrata, etc. by any suitable means well known in the art, and not shown. While not illustrated for reasons of simplicity, each of the heat treatment air section 10 and the cooling air section 11 is suitably enclosed so that the desired temperature conditions can be maintained therein upon being obtained by suitable means, not shown. In the heat relax air section 10 the entering film F is guided and supported in an undulating path by a series of upper idler rolls 13 and lower idler rolls 13'. The idler rolls 13 and 13' extend completely across the film path to engage the full width of the film and are rotatably supported at opposite ends in pairs of upper and lower support bars 14 and 14', respectively, extending along opposite sides of the section.

Upon leading the heat relax section 10 the film passes under partition 12 and over idler roller 27 where it is redirected vertically upward through the cooling air section 11 and over guide rolls 27 and upper guide rolls 15. As the film moves upwardly upon entering the cooling air section 11, it passes between two air plenums 20 which are provided along their length with openings, not shown, through which streams of cool air issue and impinge upon the full width of the film as indicated at 21.

In the manufacture of polyester films, for example, temperature to which the film is subjected in the heat treatment section 10 may range from about 150° F. to about 400° F. depending upon the type of treatment the film has received prior to reaching this final heat treatment stage as well as the kind of polymer the film is made of. In the case of poly(ethylene terephthalate) film support, for example, for some apparently unexplainable reason, it has been observed that bagginess defects such as those illustrated by the areas L in FIG. 3 appear in an otherwise practically perfectly flat sheet. Almost invariably, the limpness defects assume shapes similar to those shown in FIG. 3, the effected areas usually being repeated along the lengthwise direction (of flow) of the sheet. Note that in FIG. 3, the dashed lines represent the arbitrary division of the sheet into sections across its width, the bagginess defect in this illustration falling within (across) sections 3, 4 and 5.

FIG. 2 illustrates one of the cooling plenums 20 in view 22 across FIG. 1. In FIG. 2, the sheet passes over idler roll 25 past tube jets 21 which are arranged in staggered row relationship down the face of plenum 20. Cool air flows through the jets 21 directly toward the surface of the hot sheet as it passed before them. The tube jets 21 in FIG. 2 have been divided by the dashed lines into sections 1 through 8 corresponding in spatial relationship across the sheet to the sections illustrated on the film sheet of FIG. 3.

I have discovered that the degree of "limpness" or "bagginess" defect in thermoplastic film that is subject to this defect can be significantly reduced by reducing the cooling capacity of the particular portion(s) of the cooling means (being used to lower the temperature of the film) that is in contact with those "sections" of the film in which this defect appears. For example, in FIG. 3, the "bagginess" defect L appears in sections 3, 4 and 5, while the "loose edge" defect $L_1$ appears in sections 1, 2, 7 and 8. To remove the "bagginess" defect in this illustration, the cooling capacity of those portions of the generic cooling means in sections 3, 4 and 5 is reduced appropriately. And to remove the "loose edge" defect along the right edge of the sheet of FIG. 3, the cooling capacity of those portions of the generic cooling means in sections 7 and 8 is reduced significantly. In the practice of one of the preferred embodiments of this invention, the cooling means is a relatively cool gas such as air. The "limpness" defects can be reduced in this embodiment by reducing the cooling capacity of the cooling gas that is being directed toward those sections of the sheet suffering from this defect. In the practice of this embodiment of my invention, the necessary reduction in cooling capacity of the cooling gases (preferably air) passing through the appropriate section of the cooling plenum can be accomplished, for example, by either partially or completely closing off the air flow through one or more of the tube jets (or other aperture means through which the cooling gas is directed toward the film sheet). This can be accomplished by means of external controls that can open or close either the individual apertures or groups of such apertures, as the need arises for more or less reduction of cooling capacity, or even by manually placing plugs in the apertures. Alternatively, electric heating units can be installed inside each of the apertures, with individual controls with respect to the amount of heat each unit can inject into the air passing past it through that particular aperture, whereby the total amount of cooling capacity of the cooling gas emerging from a given section (lengthwise with respect to the direction of movement of the film) of the cooling plenum can be reduced in a controlled manner by simply turning on one or more of the heating units in such section and/or regulating the relative amounts of heat output of the various heating units in such section. By gradually reducing the cooling capacity of the cooling gas over that section of the film in which the limpness defect appears, one can observe (by the test described above) in the product film a gradual reduction in the size and occurrence of the troublesome limpness defects. Or, if desired, the necessary reduction in cooling capacity of the cooling gases can be accomplished stepwise, or even all at once in some instances.

It should be noted that the lengthwise or vertical "sections" referred to herein can be relatively wide or narrow, as the need arises to cure the limpness defects, and generally, the cooling capacity needs to be reduced, in the practice of this invention, only with respect to the cooling gases passing through apertures in the cooling plenum directly past which the limpness defects flow, or which direct cooling gas toward that section of the film sheet in which the limpness defect is observed.

In the practice of one of the preferred embodiments of this invention, in which jet tubes are used in a cooling plenum such as that shown in FIG. 2, each of the apertures leading to the jet tubes is fitted with a conventional throttling valve mechanism for separately narrowing or closing the aperture, or any or all of the apertures, as desired, each of which mechanisms can be separately controlled at a panel mounted outside the machine. Limpness defects are detected in sections 3, 4 and 5 of the film, for example. By completely closing 13 of the apertures at the beginning end of that section corresponding to sections 3, 4 and 5 in each of the cooling plenums (illustrated by X over those apertures in these "sections" that were closed), the limpness defect is cured. Similarly, the limpness defect appearing in sections 7 and 8 can be substantially decreased in size by closing off six apertures in "sections" 7 and 8 of the cooling plenum. When the limpness defect appears at the edges of the sheet, it can also be significantly reduced by reducing the cooling capacity of the ends of the rolls in the cooling section (into contact with which the film comes) by, for example, "core" heating the end of several of the rolls on that side of the sheet in which the defect appears (to thereby decrease the so-called "end" loss of heat from the rolls).

When cool rolls are utilized as the major means for cooling the film, conventional means for supplying varying amounts of a cooling liquid (through the core of the rolls) to the various "sections" of the rolls can be used to advantage in the practice of this invention, whereby, the temperature and/or the amount of cooling liquid (that is supplied to those "sections" of the rolls in contact with the corresponding sections of the film sheet in which the limpness defect is detected) can be reduced to thereby reduce the cooling capacity of those "sections."

The invention has been described in detail with particular reference to preferred embodiments thereof, but it will be understood that variations and modifications can be effected within the spirit and scope of the invention.

What is claimed is:

1. In a process for manufacturing an oriented, heat stabilized thermoplastic resin film which process comprises sequentially (a) passing oriented, heat stabilized film in the form of a hot film through a heated section in which the temperature of said film is maintained above its second order transition temperature, and (b) passing said hot film through a cooling section in which the temperature of said film is lowered to below said second order transition temperature;

said cooling section having a plurality of cooling means for gradually reducing the temperature of said hot film while said film is passed through said cooling section;

the improvement which comprises independently reducing the cooling capacity of those cooling means being employed to cool at least one of the web sections across the width of the film when said web section is detected to be relatively more limp than the remainder of said web sections.

2. In a process for manufacturing an oriented, heat stabilized thermoplastic resin film which process comprises sequentially (a) passing oriented, heat stabilized film in the form of a hot film through a heated section in which the temperature of said film is maintained above its second order transition temperature, and (b) passing said hot film through a cooling section in which the temperature of said film is lowered to below said second order transition temperature;

said cooling section having means for separately directing cool gas toward respective web sections across the width of the surface of said hot film while said temperature of said film is being lowered;

the improvement which comprises reducing the cooling capacity of said cool gas being directed toward at least one web section which is detected to be relatively more limp than the remainder of said web sections.

3. An improved process as in claim 2, wherein said cooling capacity is reduced by reducing the volume of the cool gas directed toward the limp web section.

4. An improved process as in claim 2, wherein said cooling capacity is reduced by heating at least some of said cool gas being directed toward said web section.

5. An improved process as in claim 1, wherein said cooling means are sections of internally cooled rollers arranged to contact the surfaces of said film.

6. An improved process as in claim 1, wherein said film in said cooling section passes over a multiplicity of idler rolls having means for heating those portions of said idler rolls contacting the edges of said film.

7. In a process for manufacturing an oriented, heat stabilized thermoplastic resin film which process comprises sequentially (a) passing oriented, heat stabilized film in the form of a hot film through a heated section in which the temperature of said film is maintained above its second order transition temperature, and (b) passing said hot film through a cooling section in which the temperature of said film is lowered to below said second order transition temperature;

said cooling section having tube jets for separately directing cool air toward respective web sections across the width of the surface of said hot film while said temperature of said film is being lowered;

the improvement which comprises closing at least one of the tube jets directing said cool air toward a web section in which limpness defects have been detected.

References Cited

UNITED STATES PATENTS

| | | | |
|---|---|---|---|
| 3,423,274 | 1/1969 | Lahm | 264—348X |
| 3,313,870 | 4/1967 | Yazawa | 264—95 |
| 3,239,588 | 3/1966 | Berggren | 264—209 |
| 2,955,318 | 10/1960 | Cook | 18—1 |
| 2,697,851 | 12/1954 | Haskell | 264—348 |

ROBERT F. WHITE, Primary Examiner

A. M. SOKAL, Assistant Examiner

U.S. Cl. X.R.

264—348